United States Patent Office 3,457,440
Patented July 22, 1969

3,457,440
COOLING ARRANGEMENT FOR DYNAMO-ELECTRIC MACHINE ROTOR WINDINGS AND SHAFT MOUNTED EXCITER
William Douglass Horsley, Heaton Works, England, assignor to C. A. Parsons & Company Limited, Newcastle-upon-Tyne, England, a British company
Filed Apr. 19, 1967, Ser. No. 632,035
Claims priority, application Great Britain, Apr. 21, 1966, 17,460/66
Int. Cl. H02k 9/00, 11/00
U.S. Cl. 310—52                                                    5 Claims

ABSTRACT OF THE DISCLOSURE

The disclosure is for direct contact cooling of the conductors of a dynamo-electric machine direct current for a rotor winding being supplied from an alternating current exciter through a rectifier assembly, the shaft of the exciter generator being coupled to the rotor shaft and the rectifier mounted on the exciter generator shaft, the rectifier assembly being connected to the rotor winding through radial connectors passing through the alternating current exciter generator shaft to conductors passing through a bore in the rotary shaft and extending into a bore in the generator exciter shaft.

---

This invention relates to dynamo-electric machines particularly, though not exclusively, turbo-generators.

The object of the present invention is to provide a machine having a D.C. supply to its rotor winding provided by an A.C. exciter through a rectifier assembly, in a manner in which required electrical connections at a coupling can be made without substantial constructional difficulties arising.

The invention consists in a dynamo-electric machine having a rotor winding supplied with D.C. excitation current from an A.C. exciter generator through a rectifier assembly, the shaft of the A.C. exciter generator being directly coupled to the rotor shaft and the rectifier assembly being mounted for rotation on the shaft of the A.C. exciter generator in which machine the rectifier assembly is connected to the rotor winding through radial connectors passing through the shaft of the A.C. exciter generator to conductors passing through a bore in the rotor shaft and extending into a bore in the A.C. generator exciter shaft.

The invention also consists in a dynamo-electric machine in accordance with the preceding paragraph in which coolant for supply to the rotor winding of the machine is supplied to a central bore in the exciter shaft and is then directed radially outwards into ducts extending axially in the exciter shaft which ducts when the exciter shaft is coupled to the rotor shaft of the machine, are aligned with ducts in the rotor shaft for conveying said coolant to the rotor winding.

The invention also consists in a dynamo-electric machine in accordance with the first of the preceding two paragraphs in which the conductors forming the rotor winding are cooled by direct contact with a coolant.

The invention also consists in a dynamo-electric machine in accordance with the first of the preceding three paragraphs in which each conductor in the bores of the rotor and A.C. generator exciter shaft has internal cooling ducts through which coolant used to cool the rotor winding is circulated.

The invention also consists in a dynamo-electric machine in accordance with the first of the preceding four paragraphs in which coolant is fed to conductors of the rotor winding at places of equi-potential in the winding.

Referring to the accompanying drawing:

FIGURE 4 is a section through the end of the turbo-generator shaft similar to that of FIGURE 1 but in a different plane to show connections for supplying liquid coolant to the rotor windings;

Figure 1:
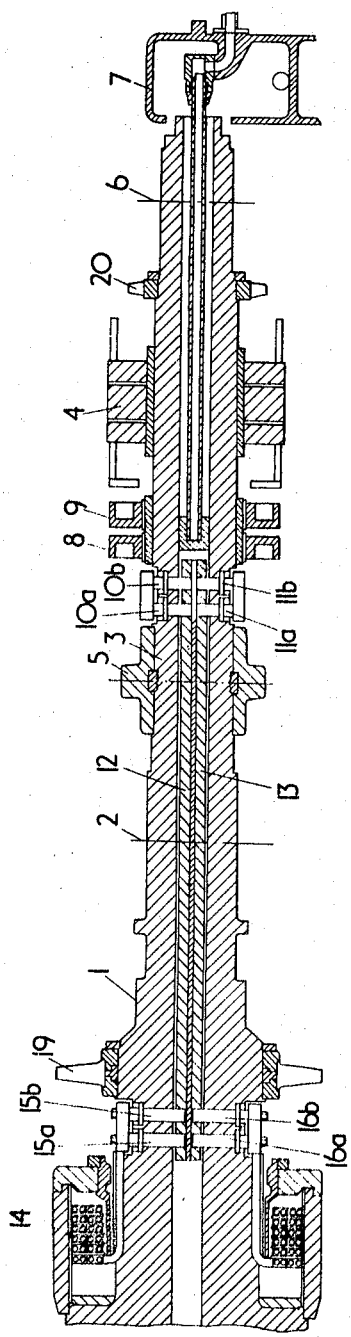
FIGURE 1 is a section through the end of a turbo-generator shaft and associated exciter shaft showing electrical connections in accordance with one embodiment of the invention.
Figure 2:
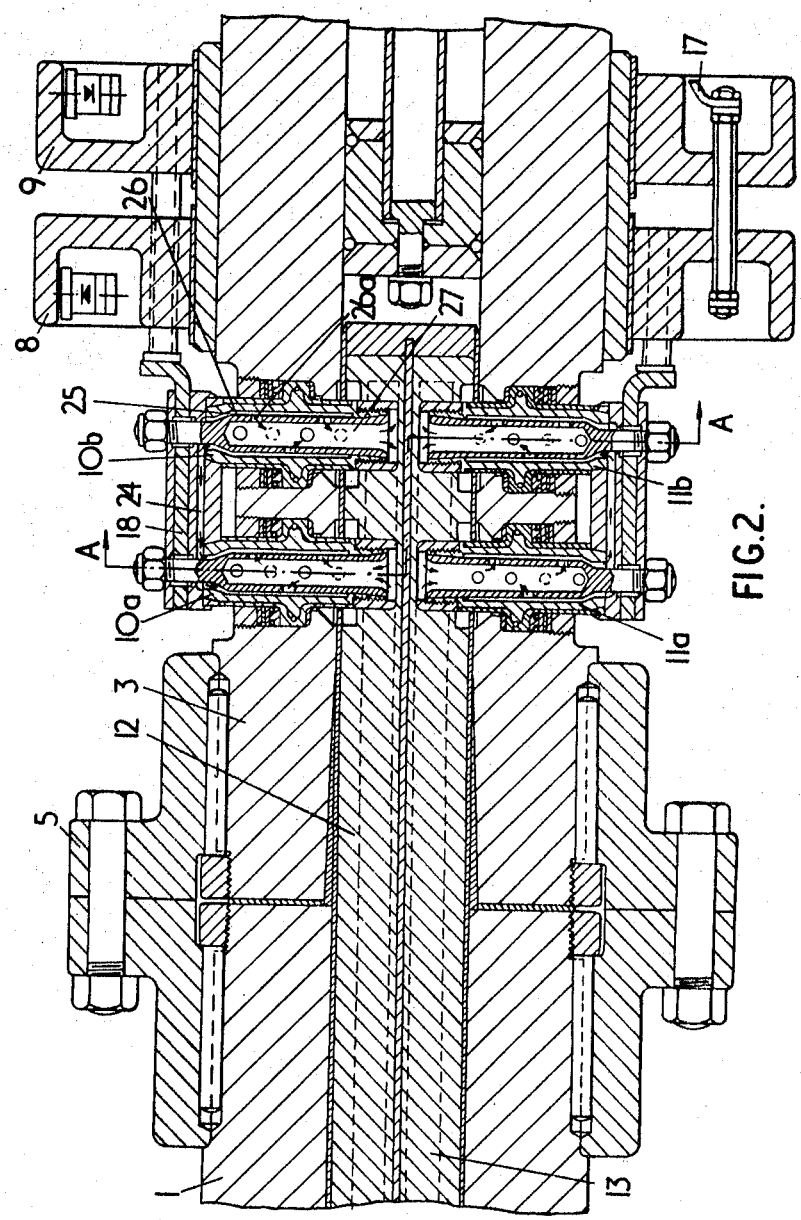
FIGURE 2 shows to an enlarged scale a portion of the turbo-generator rotor shaft shown in FIGURE 1 in the region of a coupling between the rotor shaft and the exciter shaft.

In carrying the invention into effect in the forms illustrated by way of example and referring first to FIGURES 1 and 2 rotor shaft 1 is that of a turbo-generator constructed as part of an arrangement comprising a rotor having a winding constituted by conductors cooled by a coolant flowing in direct contact with the material thereof, the coolant being fed into the conductors and removed therefrom at places of equi-potential in the winding, the aforesaid shaft 1 being supported in main pedestal bearings the centre line of one of which is shown at 2. The shaft 1 is connected to shaft 3 of A.C. exciter 4 by means of a coupling 5. The outboard end of the exciter shaft 3 is supported in a bearing the centre line of which is shown at 6. Forming part of the pedestal for bearing 6 is a housing 7 for the transfer of coolant for example liquid coolant or a high pressure gas coolant to and from the windings of the turbo-generator rotor through the exciter and rotor shafts as will be described herein in detail later.

Mounted on the exciter shaft 3 are rectifier assemblies 8 and 9 which rotate with the exciter shaft, and contain semi-conductor diodes.

An A.C. supply from the exciter 4 is rectified in the rectifier assemblies 8 and 9 and then connected via radial connectors 10a, 10b and 11a, 11b to conductors 12 and 13 passing through the rotor shaft 1. The electrical connections between the conductors 12 and 13 in the rotor shaft and the rotor winding 14 are made via radial connectors 15a, 15b and 16a, 16b. The details of the radial connectors are omitted in FIGURE 1 for the sake of clarity, but are shown in FIGURE 2.

Leads 17 connect the A.C. exciter 4 (see FIGURE 1) to the rectifier assemblies 8 and 9. Assembly 8 may consist entirely of positive diodes and assembly 9 entirely of negative diodes or vice versa. Leads 18 connect the rectifier assemblies to radial connectors 10a, 10b and 11a, 11b.

The connectors 10a, 10b are joined to conductor 12 which is a hollow conductor containing two axial passages for coolant. The connectors 11a, 11b are joined to conductor 13 which also is a hollow conductor containing two axial passages for coolant.

The conductor 12 is connected to the rotor winding by radial connectors 15a, 15b and conductor 13 is connected to the rotor winding via connectors 16a, 16b.

The provision of coolant passages in each conductor 12 and 13 is not essential but if it is desired to cool the conductors the use of two axial coolant passages provides a convenient way of allowing coolant to circulate from the rotor winding through radial connectors through one passage and then return to the winding via the other passage.

Also shown on the rotor and exciter shafts, but forming no essential part of the invention, are axial flow fan impellers 19 and 20 for circulating cooling gas within the generator and exciter housings in a known manner.

Figure 3:
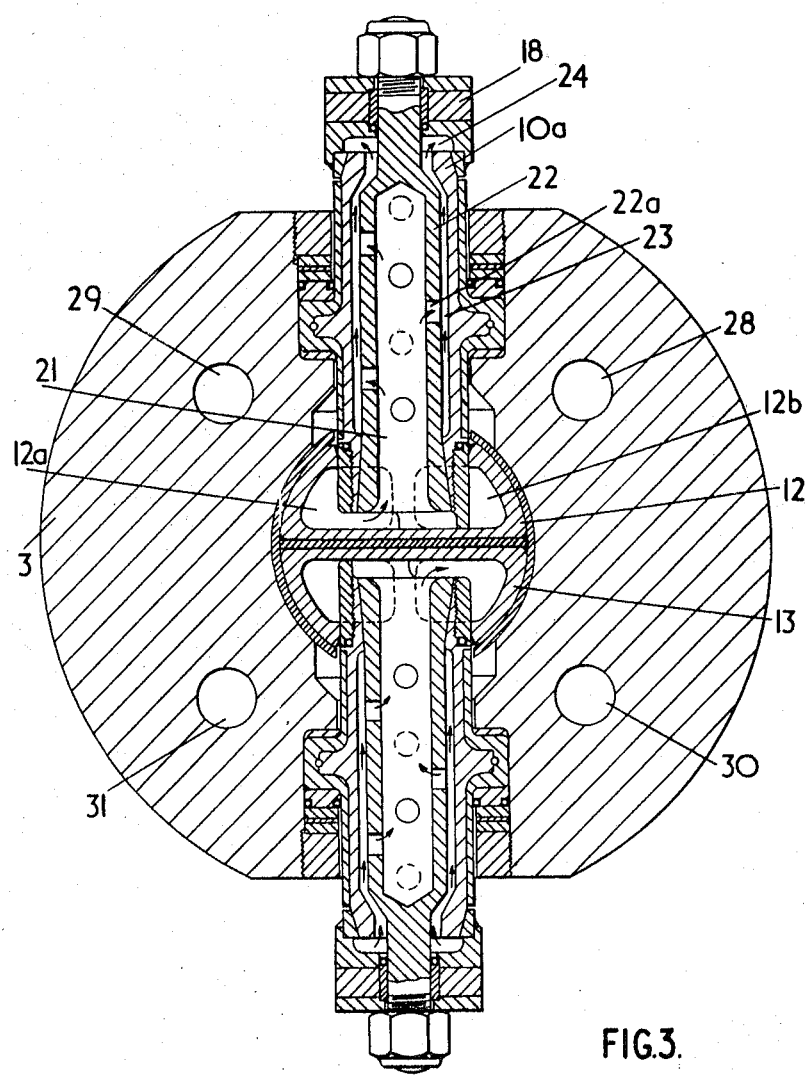
FIGURE 3 is a section on line A—A of FIGURE 2.

The constructional details of the radial connectors 10a, 10b, 11a, 11b and the conductors 12 and 13 are shown in FIGURES 2 and 3. Coolant from the rotor winding 14 (see FIGURE 1) flows along passage 12a in conductor 12 and enters a central passage 21 in the radial connector 10a via a cut-away portion at the inner end of the radial connector. The passage 21 is formed by a central hollow bolt 22 which serves to join the connector 10a to the lead 18 and at the same time holds the connector against the action of centrifugal force. The bolt has passages 22a which permit the coolant to pass from passage 21 into an annular space 23 between the bolt 22 and connector 10a. From the annular space 23 the coolant enters space 24 through which it flows to annular space 25 (FIGURE 2) between connector 10b and its central bolt 26. The coolant then flows through radial passages 26a in bolt 26 and enters central space 27. From space 27 it flows downwards to leave the radial connector via a cut-away portion linking the connector with passage 12b in conductor 12. The cut-away portions of radial connectors 10a and 10b are on opposite sides of the connectors so that connector 10a communicates with passage 12a only and connector 10b communicates with passage 12b only. The coolant then returns to the rotor winding via passage 12b. The radial connectors 15a and 15b are of similar construction to connectors 10a and 10b. The coolant flow arrangements for the connectors 11a, 11b and 16a, 16b via passages 13a and 13b in conductor 13 are similar to those described above in connection with connectors 10a, 10b, 15a, 15b and conductor 12.

It will be seen from FIGURES 1 and 2 that the conductors 12 and 13 extend from the end of the rotor shaft 1 into the bore of exciter shaft 3. When it is desired to gain access to the electrical connections or the ends of the conductors, the radial connectors 10a, 10b and 11a, 11b can be removed and the exciter shaft 3 moved axially to expose the protruding ends of the conductors 12 and 13. There is therefore no break in the conductors at the coupling 5 and consequently no need to make disconnectable junctions in the conductors at the coupling.

The coolant is not fed into or removed from the winding via the radial electrical connectors but at points of equipotential in the winding. Ducts 28, 29, 30 and 31 in the exciter shaft 3 can be seen in FIGURE 3. Ducts 28 and 29 constitute the entry and return path for coolant to one coil of the rotor winding which in this case is a two-pole winding, and ducts 31 and 30 constitute entry and return paths for coolant for the other coil of the rotor winding. The winding construction need not be described in detail here.

Figure 5:
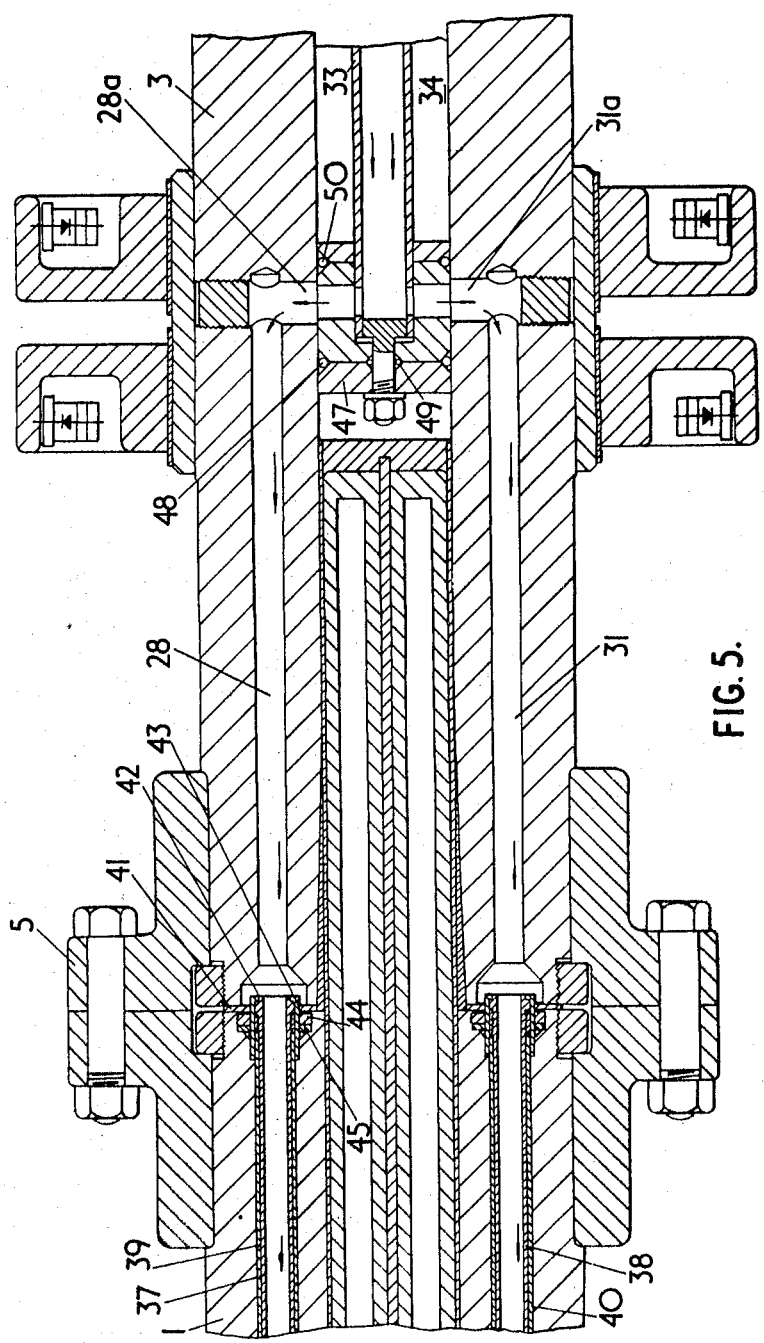
FIGURE 5 shows to an enlarged scale a portion of FIGURE 4 in the region of the coupling linking the rotor shaft to the exciter shaft.

The arrangement for supplying coolant to and removing it from the rotor winding is illustrated in FIGURES 4–8. Coolant, for example distilled water or high pressure hydrogen at say 2,000 lbs. per sq. in., is fed into housing 7 at the end of the exciter shaft 3 through passage 32. It then enters passage 33 which is a tube supported within bore 34 of the exciter shaft. The protruding end of tube 33 rotates in a combined seal and bearing 35 formed in the stationary member 36 in housing 7. Coolant entering tube 33 flows in an axial direction therethrough to a position adjacent the rectifier assemblies 8 and 9 where it divides via radial passages 28a, 31a to connect with axial passages 28 and 31 which convey the coolant to the rotor winding as shown in FIGURE 4. The portion of ducts 28 and 31 lying within the turbo-generator rotor shaft contain additional tubular members 37 and 38 which, as can be seen from FIGURE 5 are electrically insulated from the shaft by electrical insulation 39 in the case of member 37 and insulation 40 in the case of member 38. In addition sealing material 41 is fitted between the end faces of the rotor and exciter shafts, to prevent the leakage of either cooling gas or liquid coolant.

The tubular members 37 and 38 are fitted with replaceable end pieces 42 which are screwed onto the ends of the tubes and are surrounded by non-metallic bushings 43. To prevent leakage along the outside of the tubes 37 and 38 a compressive washer 45 is held in position by a gland nut 44 and acts against an O-ring seal. A similar tube end fitting and seal are provided for each of the tubes shown in the return ducts 29 and 30 in FIGURE 6.

As can be seen in FIGURE 5 the end of the tube 33 beyond the radial passages is sealed by a clamp plate 47 which compresses O-ring seals 48, 49 and 50.

Figure 6:
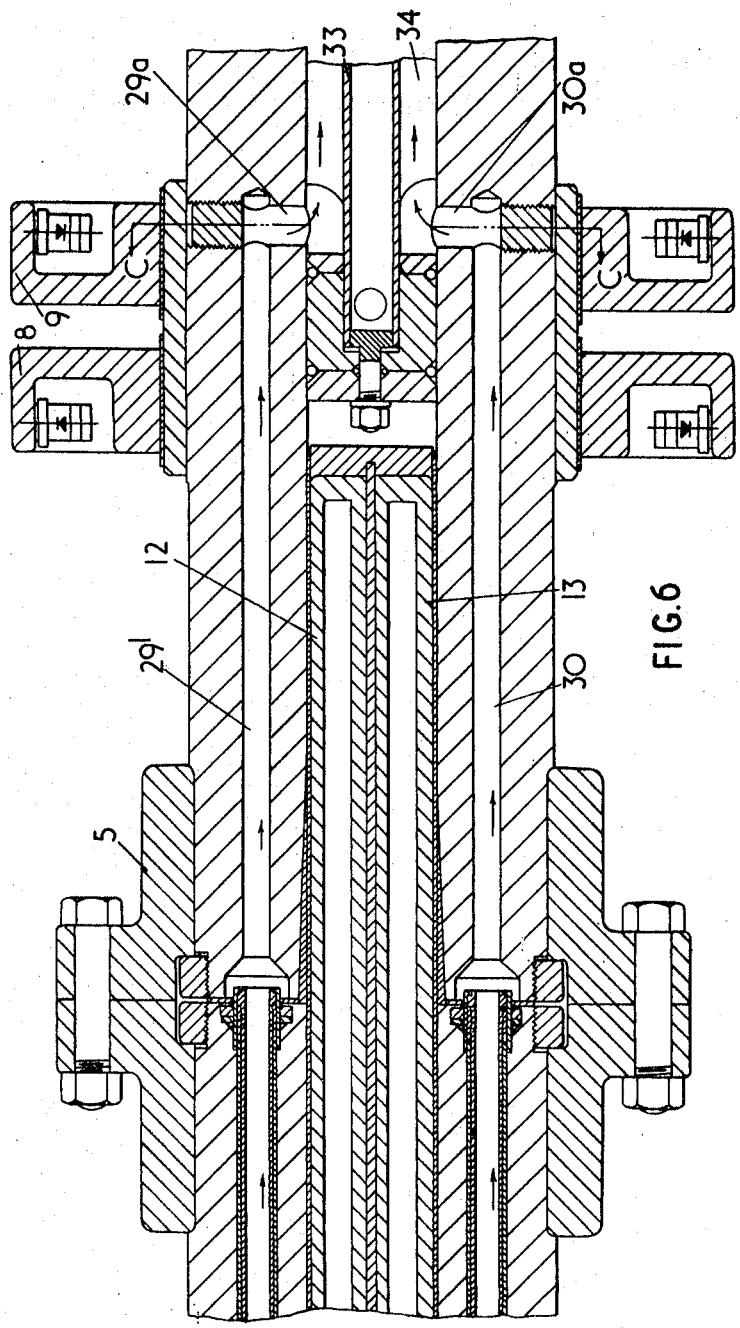
FIGURE 6 is a section similar to that of FIGURE 5 but in a different plane, being a section on line B—B of FIGURE 7.
Figure 7:
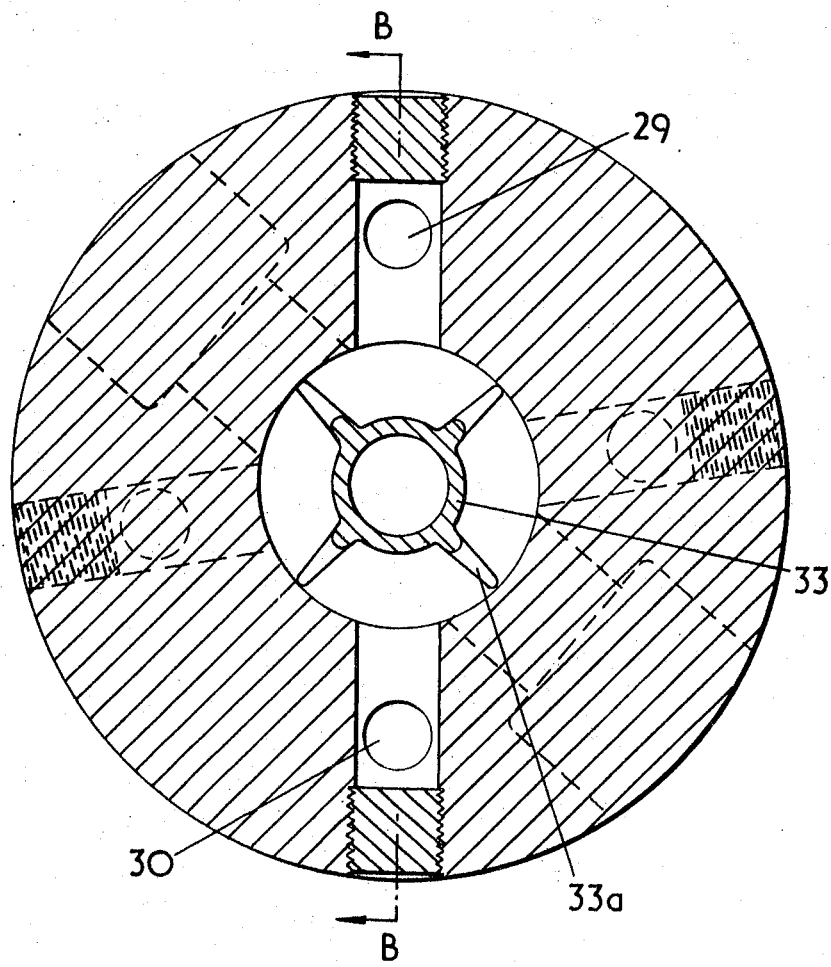
FIGURE 7 is a section on line C—C of FIGURE 6.
Figure 8:
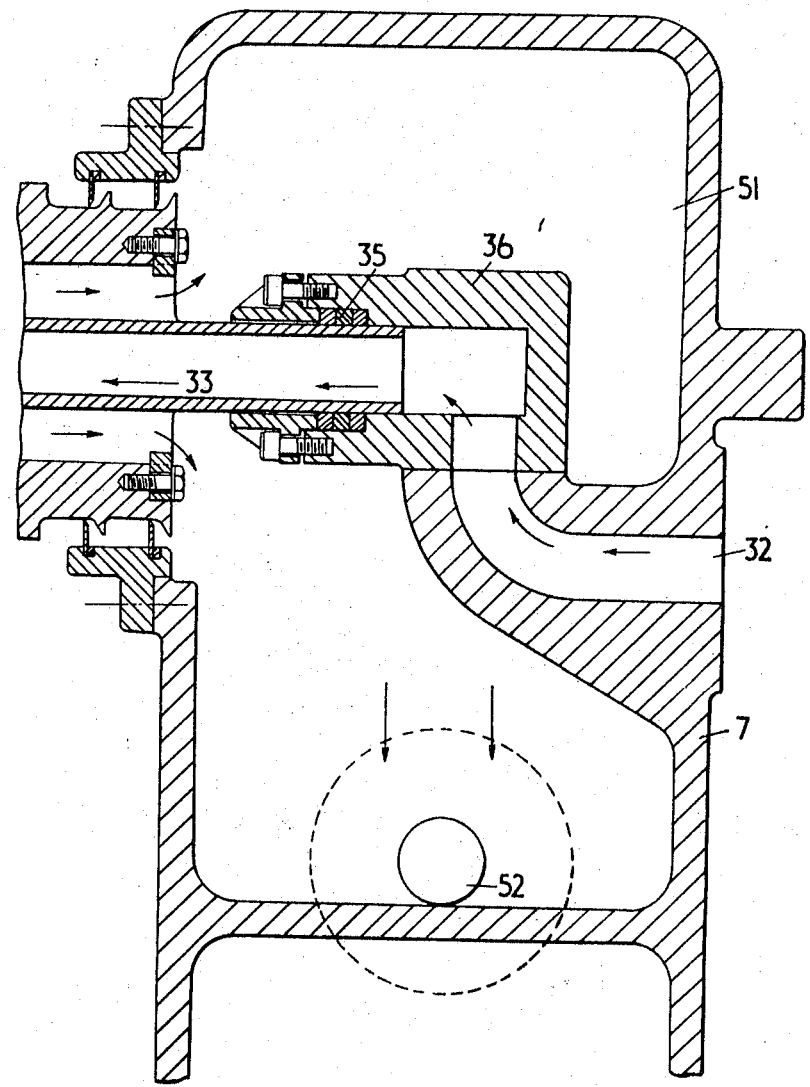
FIGURE 8 is a section through a pedestal at the end of the exciter shaft showing details of the connection for liquid coolant to the shaft.

The return paths for coolant from the rotor winding are constituted by ducts 29 and 30 visible in the section shown in FIGURE 6. In FIGURE 7 the tube 33 has radial vanes 33a which serve to locate it in shaft bore 34. On leaving ducts 29 and 30 of FIGURE 6, radial ducts 29a and 30a carry the coolant into the bore 34 in the shaft 3 and the coolant leaves the shaft to enter discharge chamber 51 of the housing 7 as shown in FIGURE 8. It leaves housing 7 through outlet 52.

I claim:
1. A dynamo-electric machine having a rotor winding supplied with D.C. excitation current from an A.C. exciter generator through a rectifier assembly, the A.C. exciter generator and the rectifier assembly being mounted on a separate shaft which is directly coupled to the rotor shaft in which machine the rectifier assembly is connected to the rotor winding through the radial connectors passing through the shaft of the A.C. exciter generator to conductors passing through a bore in the rotor shaft and extending into a bore in the A.C. generator exciter shaft.

2. A dynamo-electric machine having a rotor winding supplied with D.C. excitation current from an A.C. exciter generator through a rectifier assembly, the shaft of the A.C. exciter generator being directly coupled to the rotor shaft and the rectifier assembly being mounted for rotation on the shaft of the A.C. exciter generator in which machine the rectifier assembly is connected to the rotor winding through radial connectors passing through the shaft of the A.C. exciter generator to conductors passing through a bore in the rotor shaft and extending into a bore in the A.C. generator exciter shaft, and coolant for supply to the rotor winding of the machine being supplied to a central bore in the exciter shaft and being then directed radially outwards into ducts extending axially in the exciter shaft which ducts when the exciter shaft is coupled to the rotor shaft of the machine, are aligned with ducts in the rotor shaft for conveying said coolant to the rotor winding.

3. A dynamo-electric machine having a rotor winding supplied with D.C. excitation current from an A.C. exciter generator through a rectifier assembly, the shaft of the A.C. exciter generator being directly coupled to the rotor shaft and the rectifier assembly being mounted for rotation on the shaft of the A.C. exciter generator in which machine the rectifier assembly is connected to the rotor winding through radial connectors passing through the shaft of the A.C. exciter generator to conductors passing through a bore in the rotor shaft and extending into a bore in the A.C. generator exciter shaft, and said conductors forming the rotor winding being cooled by direct contact with a coolant.

4. A dynamo-electric machine as claimed in claim 1 in which each conductor in the bores of the rotor and A.C' generator exciter shaft is provided with internal cooling ducts through which coolant used to cool the rotor winding is circulated.

5. A dynamo-electric machine having a rotor winding supplied with D.C. excitation current from an A.C. exciter generator through a rectifier assembly, the shaft of the A.C. exciter generator being directly coupled to the rotor shaft and the rectifier assembly being mounted for rotation on the shaft of the A.C. exciter generator in which machine the rectifier assembly is connected to the rotor winding through radial connectors passing through the shaft of the A.C. exciter generator to conductors passing through a bore in the rotor shaft and extending into a bore in the A.C. generator exciter shaft, and coolant being fed to conductors of the rotor winding at places of equi-potential in the winding.

References Cited

UNITED STATES PATENTS

| | | | |
|---|---|---|---|
| 2,722,652 | 11/1955 | Brainard | 310—68.4 |
| 2,897,383 | 7/1959 | Barrows | 310—261 |

MILTON O. HIRSHFIELD, Primary Examiner

R. SKUDY, Assistant Examiner

U.S. Cl. X.R.

310—68